United States Patent
Fukunaga et al.

(10) Patent No.: US 6,871,230 B1
(45) Date of Patent: Mar. 22, 2005

(54) SYSTEM AND METHOD FOR PERSONAL IDENTIFICATION

(75) Inventors: Masajiro Fukunaga, Tokyo (JP);
Michio Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 714 days.

(21) Appl. No.: 09/606,404

(22) Filed: Jun. 29, 2000

(30) Foreign Application Priority Data

Jun. 30, 1999 (JP) .......................................... 11-184560

(51) Int. Cl.⁷ ........................ G06F 15/173; G06F 15/16
(52) U.S. Cl. ........................ 709/225; 709/223; 709/227
(58) Field of Search ........................ 709/219, 224–225, 709/227–229, 203, 204, 208, 216, 217, 232, 312; 713/186

(56) References Cited

U.S. PATENT DOCUMENTS

| | | | | |
|---|---|---|---|---|
| 5,887,140 A | * | 3/1999 | Itsumi et al. ................ | 709/225 |
| 6,189,032 B1 | * | 2/2001 | Susaki et al. ................ | 709/225 |
| 6,256,402 B1 | * | 7/2001 | Terao ........................... | 382/125 |
| 6,385,730 B2 | * | 5/2002 | Garrison ...................... | 713/202 |
| 6,445,777 B1 | * | 9/2002 | Clark ....................... | 379/88.13 |
| 6,487,659 B1 | * | 11/2002 | Kigo et al. .................. | 713/168 |
| 6,636,973 B1 | * | 10/2003 | Novoa et al. ................ | 713/202 |

FOREIGN PATENT DOCUMENTS

| | | | | |
|---|---|---|---|---|
| JP | 7-050665 | 2/1995 | ............. | H04L/9/32 |
| JP | 7-064911 | 3/1995 | ........... | G06F/15/00 |
| JP | 8-329010 | 12/1996 | | |
| JP | 10-105516 | 4/1998 | ........... | G06F/15/00 |
| JP | 10-161979 | 6/1998 | ........... | G06F/15/00 |
| JP | 10-240691 | 9/1998 | | |
| JP | 11-039483 | 2/1999 | ............. | G06T/7/00 |

* cited by examiner

*Primary Examiner*—Saleh Najjar
*Assistant Examiner*—Hussein A El-chanti
(74) *Attorney, Agent, or Firm*—Foley & Lardner LLP

(57) ABSTRACT

A personal identification system includes local computer systems to be operated by authorized users, a remote computer system having common resources (data, hardware, etc.) to be accessed from the local computer systems, and a personal verification system having a database section which stores passwords of each authorized user and physical characteristics data corresponding to each password. When a user made a request to a local computer system for the use of the common resources of the remote computer system, physical characteristics (a fingerprint etc.) of the user is scanned by a scanning section of the local computer system, and characteristics data generated based on the scanned physical characteristics is sent to the personal verification system. The personal verification system searches the database section for a password using the received characteristics data as a key, and sends the searched password to the local computer system. The local computer system which received the password sends the password to the remote computer system for personal identification of the user. Passwords of the authorized users are managed solely by the personal verification system, thereby the user is allowed to make access to the common resources of the remote computer system easily and freely without the need of memorizing and inputting a complicated password.

24 Claims, 2 Drawing Sheets

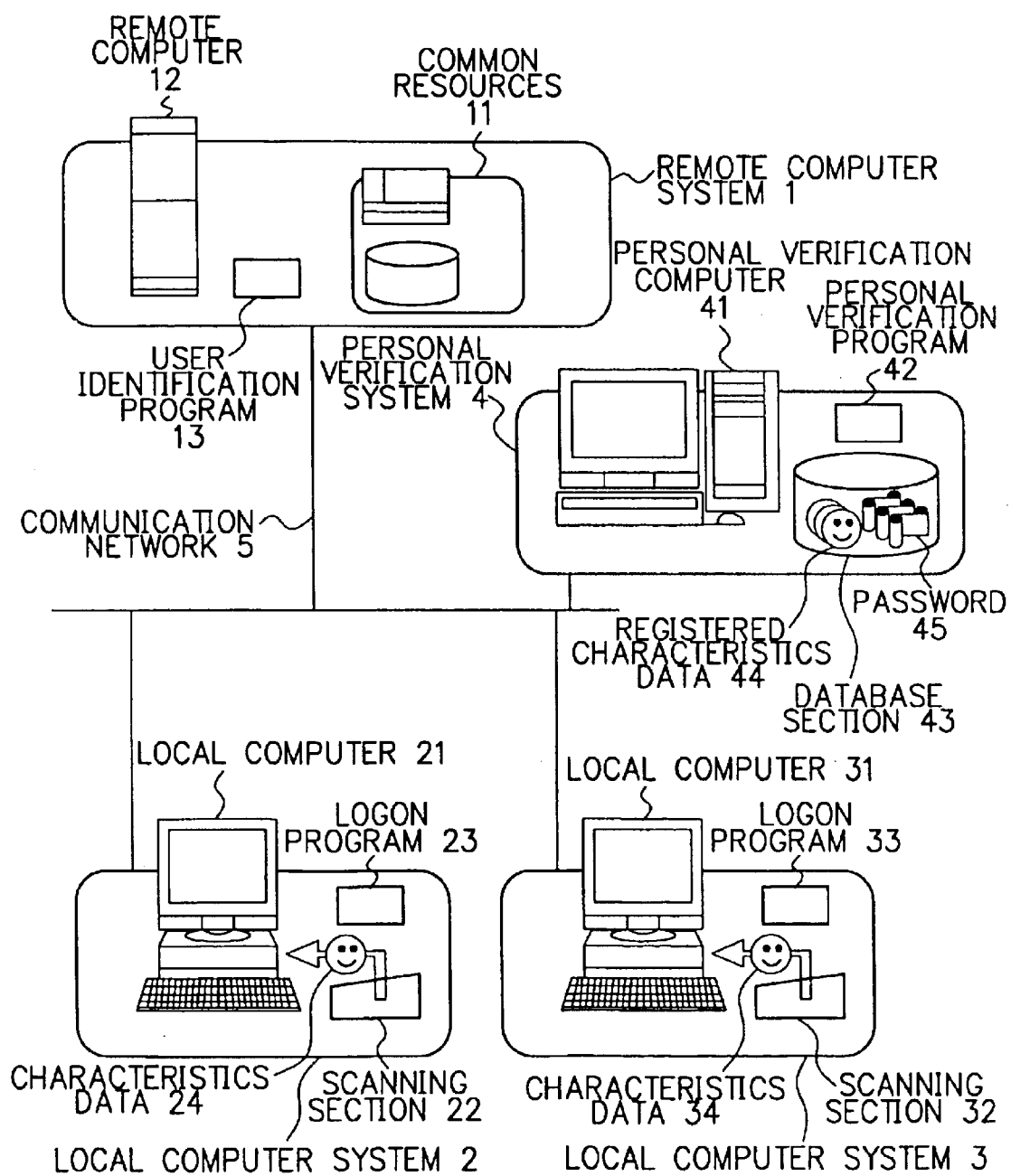

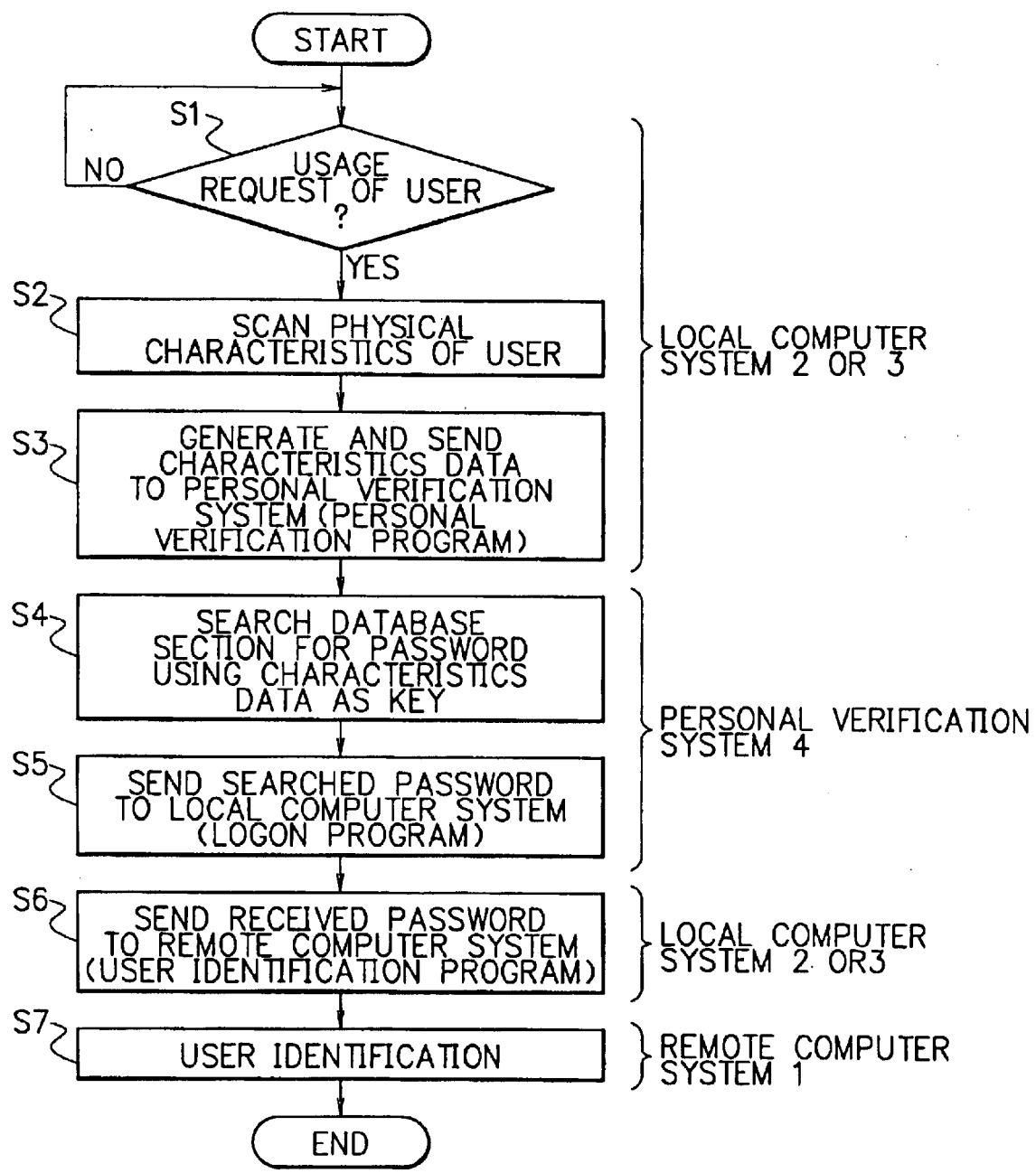

SYSTEM AND METHOD FOR PERSONAL IDENTIFICATION

BACKGROUND OF THE INVENTION

The present invention relates to a personal identification system and a personal identification method, and in particular, to a personal identification system and a personal identification method for an information processing system including two or more local computers and a remote computer having common resources which can be accessed by each of the local computers.

DESCRIPTION OF THE PRIOR ART

When common resources of a remote computer (that is, data which are stored in the remote computer, hardware (printer, scanner, etc) which is connected to the remote computer, etc.) of a communication network system (information processing system) are shared by users of the system who make access to the remote computer from local computers, personal identification of the users becomes necessary. As a general conventional personal identification method, each user inputs his/her secret password directly from a keyboard of a local computer, and the inputted password is sent to a personal identification function of the remote computer to be verified.

Besides the above conventional personal identification method, various types of personal identification methods have been proposed. For example, in Japanese Patent Application Laid-Open No.HEI10-105516, the load for the personal identification is distributed, in which security management is executed at the entrance of the network. The user is required to input his/her user ID and password for the personal identification, and the inputted user ID and password are sent to a security management function of the network to be verified.

In a conventional personal identification method disclosed in Japanese Patent Application Laid-Open No.HEI10-161979, a fingerprint of the user, in addition to the user ID and password, is used for the personal identification of the user. By use of the three types of information, the reliability of the personal identification is improved.

In conventional personal identification methods disclosed in Japanese Patent Application Laid-Open No.HEI7-64911, Japanese Patent Application Laid-Open No.HEI7-50665 and Japanese Patent Application Laid-Open No.HEI11-39483, a user card, in which personal identification information (fingerprint etc.) has preliminarily been stored, is supplied to each user of the communication network system, and when the user makes access to the communication network system, actual personal identification information (fingerprint etc.) of the user who is operating a local computer is verified against the personal identification information (fingerprint etc.) which has been stored in the user card. The access to the communication network system is permitted if the actual personal identification information of the user matched the personal identification information stored in the user card, thereby the user and the service provider are protected from damages even in cases where the user card is stolen and an illegal use of the user card is attempted.

However, the conventional personal identification methods which have been explained above involves the following problems or drawbacks.

First, in the conventional personal identification methods employing passwords, users tend to forget the password which the user himself/herself has determined and set. The user is apt to set a complicated password that is hard to guess, in order to prevent illegal access of a third party to the remote computer.

Second, even if the password is preliminarily described or stored in a computer file of a local computer in order to eliminate the above "password forgetting problem", the computer file storing the password is managed in each local computer independently, and thus the user is unable to be identified when the user is operating a different local computer.

Third, if the local computer which stores the computer file including the password of the user is shared by two or more persons, the stored password is easily stolen by the persons sharing the local computer, since each stored password is generally not protected in the local computer by means of a password etc.

In the conventional personal identification methods of Japanese Patent Application Laid-Open Nos.HEI10-105516 and HEI10-161979, the user is still required to input the password, and thus the above first problem (password forgetting problem) occurs. The user is further required to input his/her physical characteristics such as a fingerprint, thereby the input operation for the personal identification is necessitated to be complicated.

In the conventional personal identification methods of Japanese Patent Application Laid-Open Nos.HEI7-64911, HEI7-50665 and HEI11-39483 employing the user card in which the personal identification information (fingerprint etc.) of the user has preliminarily been stored, cost and effort are necessary for preparing and issuing the user cards. Further, when a user uses two or more local computers (terminals), the user is required to re-connect (re-insert) the user card for personal identification on every change of the local computers. When the user disconnects the user card from a local computer, the user is no more permitted to use the local computer because of the security problem. In order to resolve the above problem, simultaneous use of two or more local computers by a user has to be prohibited, or two or more user cards have to be issued to each user at considerable cost and effort.

SUMMARY OF THE INVENTION

It is therefore the primary object of the present invention to provide a personal identification system and a personal identification method, by which common resources of a remote computer can be shared and used by authorized users of local computers, without requiring the user to memorize and input a complicated password.

Another object of the present invention is to provide a personal identification system and a personal identification method for an information processing system including two or more local computers and a remote computer having common resources to be shared by authorized users of the local computers, by which a local computer can be used by two or more users safely without the danger of leaks and illegal use of passwords even if the local computer has to be shared by two or more users.

Another object of the present invention is to provide a personal identification system and a personal identification method for an information processing system including two or more local computers and a remote computer having common resources to be shared by authorized users of the local computers, by which the simultaneous use of two or more local computers by a user can be realized easily and freely, without the need of issuing two or more user cards etc. to each user at considerable cost and effort.

In accordance with a first aspect of the present invention, there is provided a personal identification system for an information processing system including two or more local computers and a remote computer having common resources which can be accessed by each of the local computers. The personal identification system comprises a personal verification system as common equipment for the local computers. The personal verification system includes a database means for storing passwords of each authorized user and physical characteristics data corresponding to each password. The local computer is provided with a physical characteristics scanning/sending means. The physical characteristics scanning/sending means scans physical characteristics of a user when the user made a request to the local computer for the use of the common resources of the remote computer, generates characteristics data based on the scanned physical characteristics of the user, and sends the characteristics data to the personal verification system. The personal verification system which received the characteristics data from the physical characteristics scanning/ sending means of the local computer searches the database means for a password using the received characteristics data as a key and sends the searched password to the local computer. The local computer which received the password from the personal verification system sends the received password to the remote computer for user identification.

In accordance with a second aspect of the present invention, in the first aspect, the remote computer includes a user personal identification means for executing personal identification of the user by use of the password which is sent from the local computer.

In accordance with a third aspect of the present invention, in the first aspect, the local computers, the remote computer and the personal verification system are connected together by a communication network.

In accordance with a fourth aspect of the present invention, in the first aspect, the communication network is an Ethernet LAN.

In accordance with a fifth aspect of the present invention, in the first aspect, the communication network is a wireless LAN.

In accordance with a sixth aspect of the present invention, in the first aspect, a fingerprint of the user is scanned by the physical characteristics scanning/sending means as the physical characteristics of the user.

In accordance with a seventh aspect of the present invention, in the first aspect, an iris pattern of the user is scanned by the physical characteristics scanning/sending means as the physical characteristics of the user.

In accordance with an eighth aspect of the present invention, in the first aspect, a retina pattern of the user is scanned by the physical characteristics scanning/sending means as the physical characteristics of the user.

In accordance with a ninth aspect of the present invention, in the first aspect, a voiceprint of the user is scanned by the physical characteristics scanning/sending means as the physical characteristics of the user.

In accordance with a tenth aspect of the present invention, there is provided a personal identification method for an information processing system including two or more local computers and a remote computer having common resources which can be accessed by each of the local computers. The personal identification method comprises a physical characteristics scanning/sending step, a personal verification step and a password sending step. In the physical characteristics scanning/sending step, a physical characteristics scanning/ sending means of a local computer scans physical characteristics of a user when the user made a request to the local computer for the use of the common resources of the remote computer, generates characteristics data based on the scanned physical characteristics of the user, and sends the characteristics data to a personal verification system. The personal verification system, which is provided to the information processing system as common equipment for the local computers, includes a database means for storing passwords of each authorized user and physical characteristics data corresponding to each password. In the personal verification step, the personal verification system which received the characteristics data from the physical characteristics scanning/sending means of the local computer searches the database means for a password using the received characteristics data as a key and sends the searched password to the local computer. In the password sending step, the local computer which received the password from the personal verification system sends the received password to the remote computer for user identification.

In accordance with an eleventh aspect of the present invention, in the tenth aspect, the personal identification method further comprises a user personal identification step. In the user personal identification step, the remote computer executes personal identification of the user by use of the password which is sent from the local computer.

In accordance with a twelfth aspect of the present invention, in the tenth aspect, the local computers, the remote computer and the personal verification system are connected together by a communication network.

In accordance with a thirteenth aspect of the present invention, in the tenth aspect, the communication network is an Ethernet LAN.

In accordance with a fourteenth aspect of the present invention, in the tenth aspect, the communication network is a wireless LAN.

In accordance with a fifteenth aspect of the present invention, in the tenth aspect, a fingerprint of the user is scanned in the physical characteristics scanning/sending step as the physical characteristics of the user.

In accordance with a sixteenth aspect of the present invention, in the tenth aspect, an iris pattern of the user is scanned in the physical characteristics scanning/sending step as the physical characteristics of the user.

In accordance with a seventeenth aspect of the present invention, in the tenth aspect, a retina pattern of the user is scanned in the physical characteristics scanning/sending step as the physical characteristics of the user.

In accordance with an eighteenth aspect of the present invention, in the tenth aspect, a voiceprint of the user is scanned in the physical characteristics scanning/sending step as the physical characteristics of the user.

BRIEF DESCRIPTION OF THE DRAWINGS

The objects and features of the present invention will become more apparent from the consideration of the following detailed description taken in conjunction with the accompanying drawings, in which:

FIG. 1 is a schematic block diagram showing a personal identification system in accordance with an embodiment of the present invention; and FIG. 2 is a flow chart showing an example of the operation of the personal identification system of FIG. 1.

DESCRIPTION OF THE PREFERRED EMBODIMENTS

Referring now to the drawings, a description will be given in detail of preferred embodiments in accordance with the present invention.

FIG. 1 is a schematic block diagram showing a personal identification system in accordance with an embodiment of the present invention. In the personal identification system of FIG. 1, a remote computer system 1, two or more local computer systems 2 and 3 and a personal verification system 4 are connected together by a communication network 5. The type of the communication network 5 is not particularly limited. The communication network 5 can be an Ethernet LAN, a wireless LAN, etc. Incidentally, while only two local computer systems (2, 3) are shown in FIG. 1 for the sake of simplicity, the number of the local computer systems is not limited.

The local computer systems 2 and 3 are capable of making access to common resources 11 of the remote computer system 1. The remote computer system 1 includes a remote computer 12 as the main part of the remote computer system 1, the common resources 11 and a user identification program 13. The user identification program 13 is executed by the remote computer 12. The common resources 11 include data which are stored in the remote computer 12, hardware (printer, scanner, etc.) which is connected to the remote computer 12, etc. The personal verification system 4 is provided to the personal identification system of FIG. 1 as common equipment for all the local computer systems 2 and 3 in order to implement the personal identification on access. The personal verification system 4 is generally implemented by a server.

Each local computer system (2, 3) includes a local computer (21, 31) as the main part of the local computer system (2, 3), a scanning section (22, 32) for scanning physical characteristics (a fingerprint etc.) of the user and generating characteristics data (24, 34), and a logon program (23, 33) which is executed by the local computer (21, 31). The logon program (23, 33) sends the characteristics data (24, 34) to the personal verification system 4, receives a password from the personal verification system 4 as the reply to the characteristics data (24, 34), and sends the password to the remote computer system 1.

The personal verification system 4 includes a personal verification computer 41 as the main part of the personal verification system 4, a database section 43 for storing passwords 45 of each authorized user and physical characteristics data 44 corresponding to each password 45, and a personal verification program 42 which is executed by the personal verification computer 41. The personal verification program 42 receives the characteristics data (24, 34) from the local computer system (2, 3), searches the database section 43 for a password 45 using the characteristics data (24, 34) as a key, and sends the searched password 45 to the local computer system (2, 3) as the reply.

In the following, the operation of the personal identification system of FIG.1 will be described in detail. FIG. 2 is a flow chart showing an example of the operation of the personal identification system of FIG. 1. The following explanation will be given taking a case where a user of the local computer system 2 makes use of the common resources 11 as an example. First, the logon program 23 which is executed by the local computer 21 receives a request of the user for using the common resources 11 ("Yes" in step S1). Differently from the conventional personal identification systems, the logon program 23 does not directly obtain the password from the user nor from a password file, but makes the scanning section 22 (scanner etc.) scan the physical characteristics (a fingerprint etc.) of the user (step S2) and generate characteristics data 24. The logon program 23 sends the characteristics data 24 generated by the scanning section 22 to the personal verification system 4 (step S3).

The personal verification program 42 of the personal verification system 4, which received the characteristics data 24 from the logon program 23 of the local computer system 2, searches the database section 43 for a password 45 using the characteristics data 24 as a key. Concretely, the personal verification program 42 verifies the characteristics data 24 against the registered characteristics data 44 which have been registered and stored in the database section 43, and if the characteristics data 24 matched one of the registered characteristics data 44, the personal verification program 42 reads out a password 45 corresponding to the matched registered characteristics data 44 from the database section 43 (step S4). The personal verification program 42 sends the password 45 to the local computer system 2 (logon program 23) (step S5).

The logon program 23 of the local computer system 2, which received the password 45 from the personal verification program 42 of the personal verification system 4, sends the password 45 to the remote computer system 1 (user identification program 13) (step S6). The user identification program 13 of the remote computer system 1 executes user identification of the user by use of the password 45 (step S7).

While the above explanation has been given on the assumption that the local computer system 2 is used by the user for the access to the common resources 11, the user identification is executed similarly if another local computer system 3 is used by the user. In addition, while a fingerprint of the user is generally employed as the physical characteristics for the personal identification of the user, other physical characteristics such as a voiceprint, an iris pattern, a retina pattern, etc. of the user can also be employed as long as the personal identification can be attained.

As set forth hereinabove, in the personal identification system and a personal identification method in accordance with the present invention, the personal verification system 4 is installed as common equipment for the local computer systems (2, 3, . . . ) and passwords of the authorized users are managed solely by the personal verification system 4. The user is only required to input his/her physical characteristics such as a fingerprint at the local computer system. Therefore, the user is allowed to make access to the common resources 11 of the remote computer system 1 easily and freely without the need of memorizing and inputting a complicated password. By the user identification by use of the physical characteristics, the "password forgetting problem" is eliminated.

Further, illegal use of the common resources 11 by an unauthorized third party can be avoided even if the third party could obtain the password of an authorized user, since the physical characteristics of the authorized user can not be inputted by the third party. A local computer system can be shared and used by two or more users safely, without the danger of leaks and illegal use of passwords. The simultaneous use of two or more local computer systems by a user can be realized easily and freely, without the need of issuing two or more user cards etc. to each user at considerable cost and effort.

The personal identification system and a personal identification method in accordance with the present invention can be implemented only by installing the personal verification system 4 and modifying the local computer systems (2, 3, . . . ) a little. There is no need of modifying the remote computer system 1.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A personal identification system for an information processing system including two or more local computers and a remote computer having common resources which can be accessed by each of the local computers, comprising:

a personal verification system as common equipment for the local computers, including a database for storing passwords of each authorized user and physical characteristics data corresponding to each password, wherein each of the local computers is provided with a physical characteristics scanning/sending means for scanning physical characteristics of a user when the user makes a request to one of the local computers for the use of the common resources of the remote computer, the physical characteristics scanning/sending means generating characteristics data based on the scanned physical characteristics of the user, and, the physical characteristics scanning/sending means sending the characteristics data to the personal verification system, and wherein the personal verification system which receives the characteristics data from the physical characteristics scanning/sending means of the one of the local computers, searches the database for a password using the received characteristics data as a key, and sends the searched password to the one of the local computers, and wherein the one of the local computers, which receives the password from the personal verification system, sends the received password to the remote computer for user identification, and wherein the personal verification system includes a computer that searches the database and that sends the searched password to the one of the local computers, the computer of the personal verification system being separate and distinct from the remote computer.

2. A personal identification system as claimed in claim 1, wherein the remote computer includes a user personal identification means for executing personal identification of the user by use of the password which is sent from the one of the local computers.

3. A personal identification system as claimed in claim 1, wherein the local computers, the remote computer and the personal verification system are connected together by a communication network.

4. A personal identification system as claimed in claim 1, wherein the communication network is an Ethernet LAN.

5. A personal identification system as claimed in claim 1, wherein the communication network is a wireless LAN.

6. A personal identification system as claimed in claim 1, wherein a fingerprint of the user is scanned by the physical characteristics scanning/sending means as the physical characteristics of the user.

7. A personal identification system as claimed in claim 1, wherein an iris pattern of the user is scanned by the physical characteristics scanning/sending means as the physical characteristics of the user.

8. A personal identification system as claimed in claim 1, wherein a retina pattern of the user is scanned by the physical characteristics scanning/sending means as the physical characteristics of the user.

9. A personal identification system as claimed in claim 1, wherein a voiceprint of the user is scanned by the physical characteristics scanning/sending means as the physical characteristics of the user.

10. A personal identification system as claimed in claim 1, wherein only the remote computer determines whether or not a user of the one of the local computers is permitted or denied access to the common resources that corresponds to data stored at the remote computer.

11. A personal identification system as claimed in claim 1, wherein the user desires to access common resources that are stored at the remote computer, and wherein the remote computer makes the sole determination, based on the received password, as to whether or not to grant the user access to the common resources, and wherein, when the user is granted access to the common resources, a user-requested portion of the common resources are sent to the one of the local computers of the user by way of the remote computer.

12. A personal identification system as claimed in claim 1, wherein the personal verification system is disposed remotely from the local computers and remotely from the remote computer.

13. A personal identification method as claimed in claim 10, wherein only the remote computer determines whether or not a user of the one of the local computers is permitted or denied access to the common resources that corresponds to data stored at the remote computer.

14. A personal identification method for an information processing system including two or more local computers and a remote computer having common resources which can be accessed by each of the local computers, comprising the steps of:

scanning, by one of local computer computers, physical characteristics of a user when the user makes a request to the one of the local computers for the use of the common resources of the remote computer;

generating, by the one of the local computers, characteristics data based on the scanned physical characteristics of the user;

sending, by the one of the local computers, the characteristics data to a personal verification system which is provided to the information processing system as common equipment for the local computers and which includes a database for storing passwords of each authorized user and physical characteristics data corresponding to each password;

receiving, by the personal verification system, the characteristics data sent from the one of the local computers;

searching, by the personal verification system, the database for a password using the received characteristics data as a key;

sending, by the personal verification system, the searched password to the one of the local computers;

receiving, by the one of the local computers, the password sent from the personal verification system; and sending, by the one of the local computers, the received password to the remote computer for user identification, wherein the personal verification system includes a computer that searches the database and that sends the searched password to the one of the local computers, the computer of the personal verification system being separate and distinct from the remote computer.

15. A personal identification method as claimed in claim 14, further comprising a user personal identification step in which the remote computer executes personal identification of the user by use of the password which is sent from the one of the local computers.

16. A personal identification method as claimed in claim 14, wherein the local computers, the remote computer and the personal verification system are connected together by a communication network.

17. A personal identification method as claimed in claim 14, wherein the communication network is an Ethernet LAN.

18. A personal identification method as claimed in claim 14, wherein the communication network is a wireless LAN.

19. A personal identification method as claimed in claim 14, wherein a fingerprint of the user is scanned in the physical characteristics scanning/sending step as the physical characteristics of the user.

20. A personal identification method as claimed in claim 14, wherein an iris pattern of the user is scanned in the physical characteristics scanning/sending step as the physical characteristics of the user.

21. A personal identification method as claimed in claim 14, wherein a retina pattern of the user is scanned in the physical characteristics scanning/sending step as the physical characteristics of the user.

22. A personal identification method as claimed in claim 14, wherein a voiceprint of the user is scanned in the physical characteristics scanning/sending step as the physical characteristics of the user.

23. A personal identification method as claimed in claim 14, wherein the user desires to access common resources that are stored at remote computer, and wherein the remote computer makes the sole determination, based on the received password, as to whether or not to grant the user access to the common resouces, and wherein, when the user is granted access to the common resources, a user-request portion of the common resources are sent to the one of the local computer of the user by way of the remote computer.

24. A personal identification method as claimed in claim 10, wherein the personal verification system is disposed remotely from the local computers and remotely from the remote computer.

* * * * *